July 31, 1956 — E. A. WERBE — 2,756,448
CHILD'S ABLUTIONARY TRAINING AID
Filed July 13, 1954
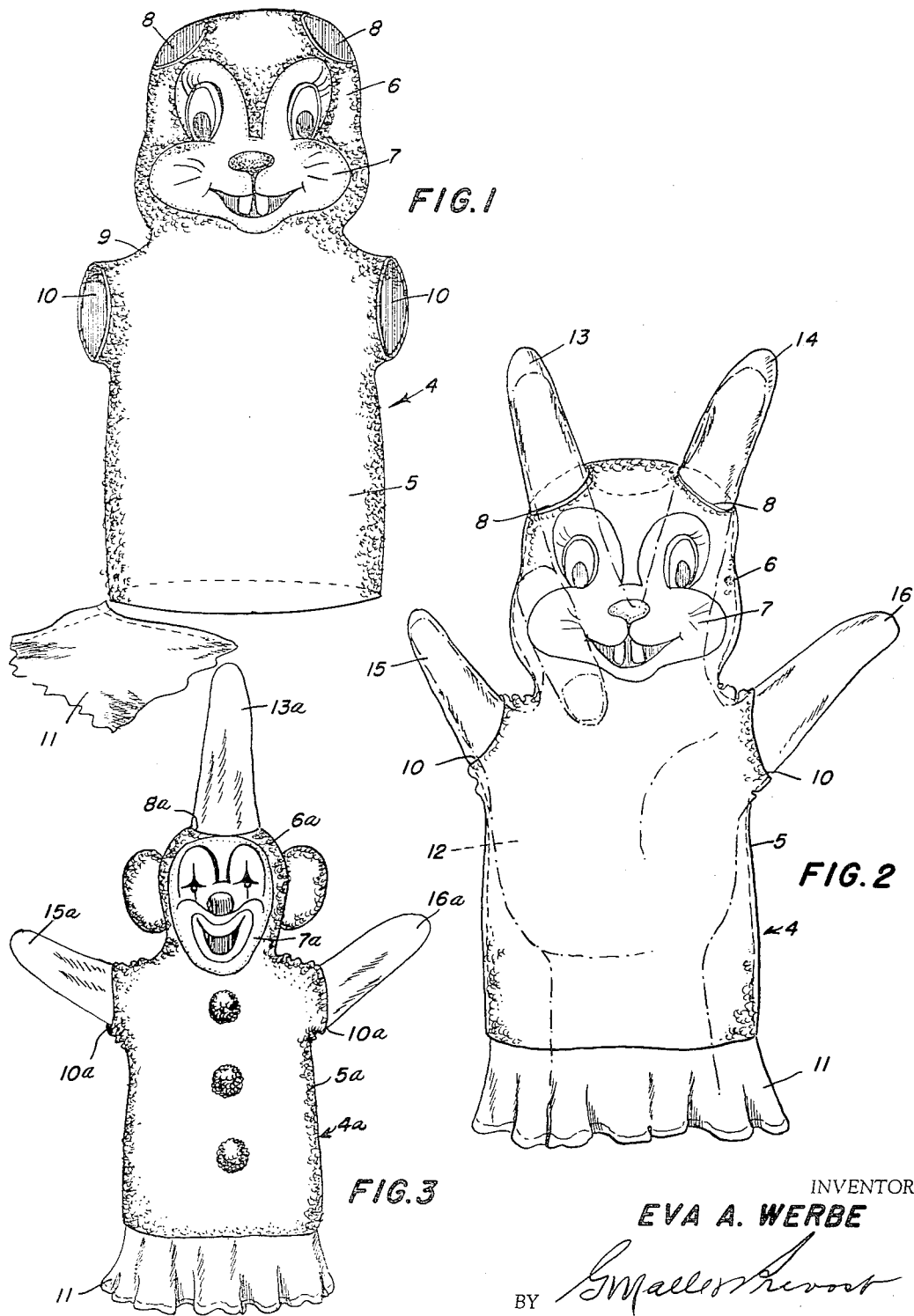
INVENTOR
EVA A. WERBE
BY *G. Mallery Grout*
ATTORNEY

United States Patent Office 2,756,448
Patented July 31, 1956

2,756,448

CHILD'S ABLUTIONARY TRAINING AID

Eva A. Werbe, Detroit, Mich.

Application July 13, 1954, Serial No. 443,001

2 Claims. (Cl. 15—118)

The present invention consists in new and useful improvements in a children's ablutionary aid and training device, primarily designed for drying areas generally inaccessible with a conventional bath towel, and has for its object to provide a device of this character which is functional as well as educational and amusing to the child.

Those having had the experience in the raising of children are familiar with the annoying problem of adequately drying the interstices in a small child's ears as well as the spaces between the toes. In the first place, many children find it objectionable and uncomfortable when the ordinary bath towel is forced into their ears by the parent in drying after a bath and their natural instinct is to draw away and act generally in an uncooperative manner. Further, it is extremely difficult to reach into the interstices of the ears as well as the spaces between the toes of a small child, with a conventional bath towel because of the nature and thickness of the material involved.

It is therefore the primary object of the present invention to provide a drying device in the form of an animated figure such as the upper portion of a rabbit's body and head, an amusing clown, or a Santa Claus, having openings at selected points in place of ears, forelegs or arms, through which portions of a sheet of relatively thin, soft, absorbent material may be projected by the fingers and thumb of the user, to represent the ears, forelegs or arms as the case may be.

Another object of this invention is to provide an animated body portion which may be composed of a relatively heavy bath towel material such as terry cloth, which although flexible is of sufficient stiffness to substantially maintain the desired shape when a hand is interposed therein and capable of being embellished with the representation of the face and upper portion of the body of the desired figure, the auxiliary drying sheet being composed of a more flexible, thinner material having greater absorbent qualities and which may more readily be inserted in the interstices of the ears and between the toes in drying a child after a bath.

With the above and other objects in view which will appear as the description proceeds, the invention consists in the novel features herein set forth, illustrated in the accompanying drawings and more particularly pointed out in the appended claims.

Referring to the drawings in which numerals of like character designate similar parts throughout the several views, Figure 1 is a front elevational view showing the animated body embellished to simulate a rabbit, a portion of the auxiliary drying sheet being shown adjacent the body.

Figure 2 is a similar view showing the manner in which the auxiliary drying sheet is projected through the ear and foreleg openings of the body, by the fingers and thumb of the user and Figure 3 illustrates a modified form of animated figure simulating the head and torso of a clown.

In the drawings, referring to Fig. 1, 4 generally represents the main body portion of the device which in the present instance, is in the form of a representation of the head and upper portion of a rabbit's body. The simulated rabbit's figure consists of a tubular body portion 5, of a circumference to receive a human hand and is preferably composed of a suitable bath towel material such as terry cloth. It will be understood however, that any suitable material may be used for this purpose.

The upper end of the body terminates in a hollow, simulated rabbit's head 6, having a face portion 7 either imprinted directly thereon or imprinted on a separate piece of smooth material and stitched thereto.

On either side of the rabbit's head 6, where the ears would normally appear, the head is provided with openings 8 of a size to accommodate the first and second fingers of a human hand, when inserted through the tubular body 5 and the hollow head 6. The upper portion of the body 5, immediately adjacent the head 6, is shaped to the contour of shoulders 9 and immediately below the shoulders, opposite sides of the body are provided with openings 10 of a size to respectively receive the thumb and little finger of a human hand when inserted through the tubular body 5.

As before stated, this body portion 4, including the head 6, is formed of a bath towel material which has sufficient stiffness to substantially maintain the shape of an animated figure when a human hand is inserted therein. Such material will readily receive the imprint of a simulated rabbit's face, directly thereon or as previously indicated, the rabbit's face may be imprinted upon a smooth fabric, and then cut out and stitched on the front portion of the head 6. The openings 8 and 10 for the ears and forearms are preferably stitched around their boundaries by any suitable means.

For use in conjunction with the main body 4, is an auxiliary drying sheet or removable lining 11, a fragment of which is shown in Figure 1, which may or may not be directly fastened to the tubular body portion 5. This auxiliary sheet is preferably composed of a much finer and more closely woven absorbent fabric such as linen. In fact, it may consist of an ordinary man's handkerchief. The essential quality of the auxiliary sheet is that it be sufficiently flexible to be inserted while draped over a human hand and fingers, into the tubular body portion 5, and projected by predetermined fingers and thumb, through the openings 8 and 10 as shown in Figure 2. The material of this auxiliary sheet must also be readily absorbent and thin enough in texture to be inserted into the small interstices of a child's ears and the spaces between his toes.

As will be seen from Figure 2, a human hand shown in dotted lines at 12, having the auxiliary sheet 11 draped thereover, is inserted through the open end of the tubular body 5 and two fingers of the hand are forced through the openings 8 in the head 6 as at 13 and 14, carrying with them portions of the auxiliary sheet 11, thus simulating the ears of the rabbit. The little finger and thumb are projected through opposite openings 10 as at 15 and 16, to simulate the forelegs of the rabbit. With this device the body portion 5 may be used for drying the child's face after washing but in order to reach the interstices in the ears, the projected portions 13, 14, 15 or 16 of the auxiliary sheet 11 are used. These projecting portions, being of the thinner and more absorbent material of the auxiliary sheet 11, will more readily reach the desired points.

One of the primary advantages of this device resides in its eye appeal to the child, so that a hitherto difficult task is transformed into an amusing and entertaining performance. At first the device may be used by the parent but it will soon be found that the child becomes sufficiently interested in the drying operation when performed with this attractive device, that he will want to insert his own hand and complete the drying operation himself. In other words, it is felt that this device in the form of a simulated animal or other subject, has an important psychological effect in training a child in the proper drying of otherwise inaccessible portions of the anatomy.

The adaptation of this invention is not confined to any particular animated figure. For example, instead of the simulated rabbit shown in Figures 1 and 2, the main body 4 may be in the form of a clown or the like as shown in Figure 3. Basically, this adaptation is similar to that just described except that the body portion 5a terminates at its upper end in a clown's head 6a and face 7a. Here, instead of having two openings 8, in the head portion, only one opening 8a is provided to receive the fore finger of a human hand with a portion of the auxiliary sheet 11 draped thereover as at 13a, to represent the clown's hat. Otherwise, the structure is generally the same, having openings 10a on either side of the body to receive the little finger and thumb as at 15a and 16a, to represent the clown's arms.

It is contemplated that various animated figures may be employed as the basis for the ablutionary training aid and it may be desirable to use a series of subjects, seasonally selected for appropriate times of the year to appeal to the fancies of the children. For example, these devices can be embellished with representations of a Santa Claus for the Christmas season, rabbits for the Easter seans, clowns for circus time and so on.

From the foregoing it is believed that my invention may be readily understood by those skilled in the art without further description, it being borne in mind that numerous changes may be made in the details disclosed without departing from the spirit of the invention as set forth in the following claims.

I claim:

1. A child's ablutionary training aid, comprising a tubular body portion, open at one end to receive a human hand and terminating at its opposite end in a hollow head portion, said body and head portions being shaped and embellished to simulate an animated figure, at least one unobstructed opening to the exterior in one of said portions accessible from the interior thereof, said opening being of a size to receive a digit of a human hand; and a removable lining sheet of soft, flexible, absorbent material, substantially contiguous with the interior surface of said body portion, a portion of said lining sheet loosely projected by said digit, through said opening to simulate an appendage of said figure.

2. A child's ablutionary training aid, comprising a tubular body portion, open at one end to receive a human hand and terminating at its opposite end in a hollow head portion, said body and head portions being formed of heavy toweling and shaped and embellished to simulate an animated figure, at least one unobstructed opening to the exterior in one of said portions accessible from the interior thereof, said opening being of a size to receive a digit of a human hand, and a removable lining sheet of thin, flexible, absorbent material, substantially contiguous with the interior surface of said body portion, a portion of said sheet being loosely projected by said digit, through said opening to simulate an appendage of said figure.

References Cited in the file of this patent
UNITED STATES PATENTS

| | | |
|---|---|---|
| D. 170,734 | Wright | Oct. 27, 1953 |
| 1,417,860 | Reich | May 30, 1922 |
| 1,683,110 | Stockbower | Sept. 4, 1928 |